(12) United States Patent
Lee et al.

(10) Patent No.: US 7,742,041 B2
(45) Date of Patent: Jun. 22, 2010

(54) LIQUID CRYSTAL DISPLAY WITH TOUCH SENSING USING VARIABLE CAPACITOR SENSOR AND PHOTOSENSOR

(75) Inventors: Joo-Hyung Lee, Owacheon-si (KR); Kee-Han Uh, Yongin-si (KR); Jong-Woung Park, Seongnam-si (KR); Sang-Jin Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1092 days.

(21) Appl. No.: 11/189,271

(22) Filed: Jul. 26, 2005

(65) Prior Publication Data

US 2006/0017710 A1  Jan. 26, 2006

(30) Foreign Application Priority Data

Jul. 26, 2004  (KR) .................. 10-2004-0058253

(51) Int. Cl.
 *G06F 3/041* (2006.01)
(52) U.S. Cl. .................. 345/173; 345/175; 178/18.06; 178/18.09
(58) Field of Classification Search ......... 345/173–174, 345/81, 104, 175; 178/18.06, 18.09; 349/12
 See application file for complete search history.

(56) References Cited

U.S. PATENT DOCUMENTS 7,009,663 B2 *  3/2006  Abileah et al. ............. 349/12
7,154,481 B2 * 12/2006  Cross et al. ............... 345/173
7,280,167 B2 * 10/2007  Choi et al. ................. 349/12

FOREIGN PATENT DOCUMENTS

CN  1193768 A  9/1998
CN  1315669 A  10/2001
WO  2004053576 A1  6/2004

* cited by examiner

*Primary Examiner*—Amare Mengistu
*Assistant Examiner*—Gene W Lee
(74) *Attorney, Agent, or Firm*—Cantor Colburn LLP

(57) ABSTRACT

A liquid crystal display includes a first panel, a second panel facing the first panel and spaced apart from the first panel, a liquid crystal layer disposed between the first panel and the second panel, a variable capacitor having a capacitance that varies by a touch and generating a control voltage that has a magnitude depending on the capacitance, and a sensing element disposed on the second panel and generating a sensing signal based on the control voltage.

25 Claims, 12 Drawing Sheets

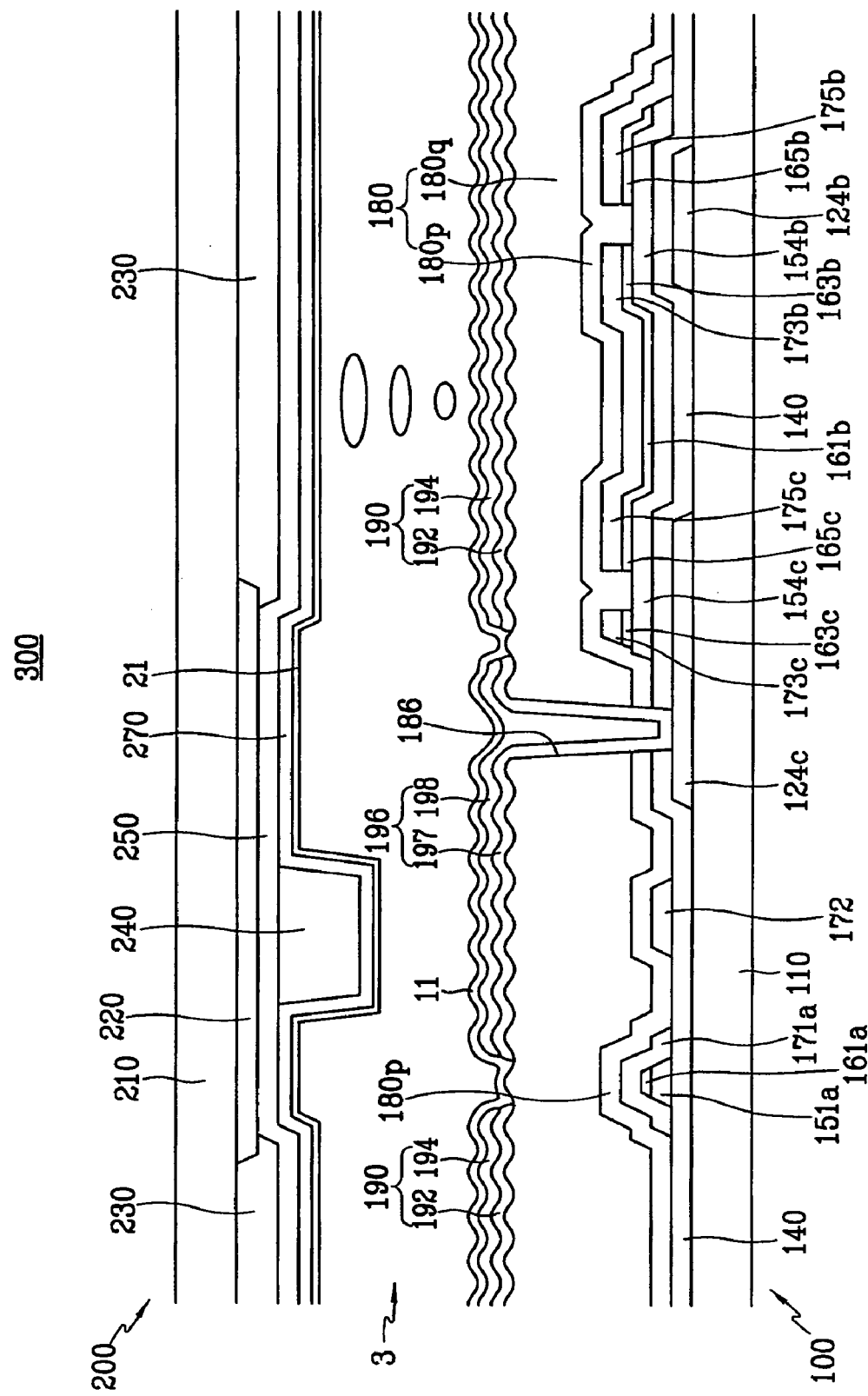

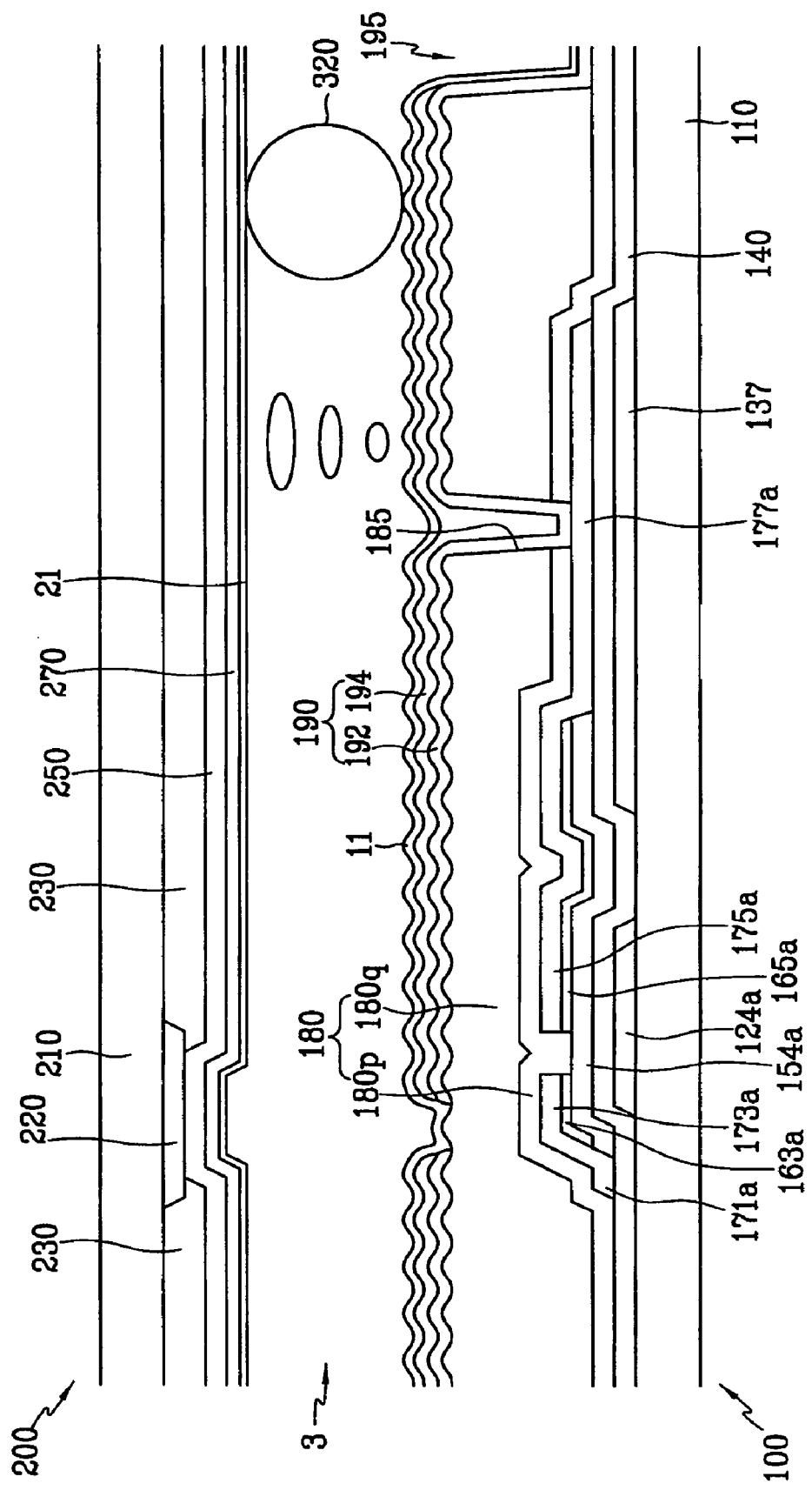

LIQUID CRYSTAL DISPLAY WITH TOUCH SENSING USING VARIABLE CAPACITOR SENSOR AND PHOTOSENSOR

BACKGROUND OF THE INVENTION (a) Field of the Invention

The present invention relates to a liquid crystal display device including a sensing element.

(b) Description of Related Art

A liquid crystal display (LCD) device includes a pair of panels provided with pixel electrodes and a common electrode and a liquid crystal layer with dielectric anisotropy interposed between the panels. The pixel electrodes are arranged in a matrix and connected to switching elements such as thin film transistors (TFTs) such that they receive image data voltages row by row. The common electrode covers entire surface of one of the two panels and it is supplied with a common voltage. A pixel electrode and corresponding portions of the common electrode, and corresponding portions of the liquid crystal layer form a liquid crystal capacitor as well as a switching element connected thereto constitute a basic element of a pixel.

An LCD device generates electric fields by applying voltages to pixel electrodes and a common electrode and varies the strength of the electric fields to adjust the transmittance of light passing through a liquid crystal layer, thereby displaying images.

A touch screen panel is an apparatus on which a finger or a stylus is touched to write characters, to draw pictures, or to instruct a device such as a computer to execute instructions by using icons. The touch screen panel has its own mechanism to determine whether and where a touch exists and it is attached usually on a display device such as an LCD device. However, an LCD device provided with a touch screen panel has some defects including high manufacturing cost due to the cost of the touch screen panel, low productivity due to a step for attaching the touch screen panel to the LCD device, reduction of the luminance of the LCD device, increase of the thickness of the LCD device.

A recent development is that photosensors including thin film transistors have been incorporated into pixels in an LCD device instead of a touch screen panel. A photosensor senses the variation of light incident on a screen user's finger or the like, to inform the LCD device whether the user's finger, for example, touches on the screen and where the touch is exerted.

However, the characteristics of a photosensor depend on exterior environments such as strength of external light, strength of backlight lamps, temperature, etc., and thus there may be many errors on the light sensing caused by these factors such that the photosensor informs of the presence of a touch that is not actually present or it fails to inform the presence of an actual touch.

In addition, a photosensor in a pixel of a display device and signal lines for transmitting signals to the photosensor may decrease aperture ratio, thereby degrading the image quality.

SUMMARY OF THE INVENTION

In an exemplary embodiment of a liquid crystal display device, the device includes a first panel, a second panel facing the first panel and spaced apart from the first panel, a liquid crystal layer disposed between the first panel and the second panel, a variable capacitor having a capacitance that varies in response to a touch applied on one of the first and second panels, and generating a control voltage that has a magnitude depending on the capacitance, and a sensing element disposed on the second panel and generating a sensing signal based on the control voltage.

The touch may include pressure and may be accompanied with variation of the incident light. The variable capacitor may include a first capacitor electrode disposed on the first panel and a second capacitor electrode disposed on the second panel. A distance between the first capacitor electrode and the second capacitor electrode may vary by the touch to vary the capacitance of the variable capacitor. The sensing element may generate an electrical signal included in the sensing signal in response to incident light. The sensing element may include amorphous silicon or polysilicon. The first capacitor electrode may be supplied with a predetermined voltage having a magnitude swinging between two values. The sensing element may include a control terminal, an input terminal, and an output terminal, and the control terminal of the sensing element may be connected to the second capacitor electrode.

In another exemplary embodiment, the liquid crystal display device may further include a first switching element connected to the output terminal of the sensing element and selectively outputting the sensing signal. The liquid crystal display may further include a sensor capacitor connected between the control terminal and the output terminal of the sensing element.

In another exemplary embodiment, a liquid crystal display device includes a plurality of image scanning lines, a plurality of image data lines intersecting the image scanning lines, a plurality of sensor data lines intersecting the image scanning lines and separated from the image scanning lines and the image data lines, and a plurality of pixels, each pixel including a display circuit and a sensing circuit, wherein the display circuit comprises a liquid crystal capacitor and a first switching element connected to the liquid crystal capacitor, one of the image scanning lines, and one of the image data lines, and the sensing circuit comprises a variable capacitor having a capacitance that varies in response to a touch applied on a display panel, a sensing element connected to the variable capacitor, and a second switching element connected to the sensing element and one of the sensor data lines.

The variable capacitor may include first and second electrodes facing each other, the liquid crystal capacitor comprises third and fourth electrodes facing each other, and the second electrode and the fourth electrode form a continuous plane.

A distance between the first electrode and the second electrode may be smaller than a distance between the third electrode and the fourth electrode.

The variable capacitor may include a first liquid crystal dielectric disposed between the first electrode and the second electrode, and the liquid crystal capacitor may include a second liquid crystal dielectric disposed between the third electrode and the fourth electrode.

The first liquid crystal dielectric and the second liquid crystal dielectric may communicate each other and the first liquid crystal dielectric may be thinner than the second liquid crystal dielectric.

Each of the second switching element and the sensing element may include a control terminal, an input terminal, and an output terminal, the input terminal of the second switching element may be coupled with the output terminal of the sensing element, the output terminal of the second switching element may be connected to one of the sensing data lines, and the control terminal of the sensing element may be coupled with the variable capacitor.

In another exemplary embodiment, the liquid crystal display device may further include a plurality of sensor control terminal lines, each sensor of the sensor control terminal lines connected to the control terminals of the second switching elements of a group of pixels. The liquid crystal display may further include a plurality of sensing scanning lines each connected to the control terminal of corresponding one of the second switching elements. The input terminal of each sensing element may be supplied with a predetermined voltage. The input terminal of the sensing element may be connected to the one of the image scanning lines.

In another exemplary embodiment of the liquid crystal display device, the device may further include an image scanning driver generating image scanning signals to be applied to the image scanning lines, an image data driver applying image data signals to the image data lines, a sensor scanning driver generating sensor scanning signals to be applied to the sensor scanning lines, a sensing signal processor receiving and processing sensing signals from the sensing elements, and a signal controller providing control signals to the image scanning driver, the image data driver, the sensing scanning driver, and the sensing signal processor.

In another exemplary embodiment, the control terminal of the second switching element may be connected to one of the image scanning lines.

In another exemplary embodiment, the liquid crystal display device may further include an image scanning driver generating image scanning signals to be applied to the image scanning lines, an image data driver applying image data signals to the image data lines, a sensing signal processor receiving and processing sensing signals from the sensing elements, and a signal controller providing control signals to the image scanning driver, the image data driver, and the sensing signal processor.

In another exemplary embodiment of a liquid crystal display device, the device includes a first substrate, a common electrode formed on the first substrate, a second substrate facing the first substrate and spaced apart from the first substrate, an image scanning line disposed on the second substrate, an image data line disposed on the second substrate and intersecting the image scanning line, a first thin film transistor connected to the image scanning line and the image data line, a pixel electrode connected to the first thin film transistor and facing the common electrode, a sensing electrode disposed on the second substrate and facing the common electrode, a second thin film transistor having a control electrode connected to the sensing electrode, and a liquid crystal layer disposed between the first substrate and the second substrate, wherein the sensing electrode and the control electrode of the second thin film transistor are floating.

The liquid crystal display device may further include a rising disposed between the first substrate and the common electrode and facing the sensing electrode. A thickness of the liquid crystal layer on the rising may range from about 0.01 microns to about 2.0 microns.

In another exemplary embodiment, the liquid crystal display device may further include an insulating layer disposed between the second thin film transistor and the sensing electrode and having a contact hole connecting the sensing electrode and the control electrode of the second thin film transistor. The sensing electrode and the pixel electrode may include the same layer and a distance between the sensing electrode and the pixel electrode is larger than about 3 microns.

The liquid crystal display device may further include a third thin film transistor having an input electrode connected to an output electrode of the second thin film transistor.

The liquid crystal display device may further include a spacer propping the first substrate and the second substrate. The pixel electrode may include a transparent electrode and a reflective electrode having an opening exposing the second thin film transistor.

BRIEF DESCRIPTION OF THE DRAWINGS

The present invention will become more apparent by describing embodiments thereof in detail with reference to the accompanying drawing in which:

FIG. 6 is a sectional view of the panel assembly shown in FIGS. 4 and 5 taken along line VI-VI';

FIG. 7 is a sectional view of the panel assembly shown in FIGS. 4 and 5 taken along line VII-VII';

DETAILED DESCRIPTION OF THE INVENTION

Figure 1:
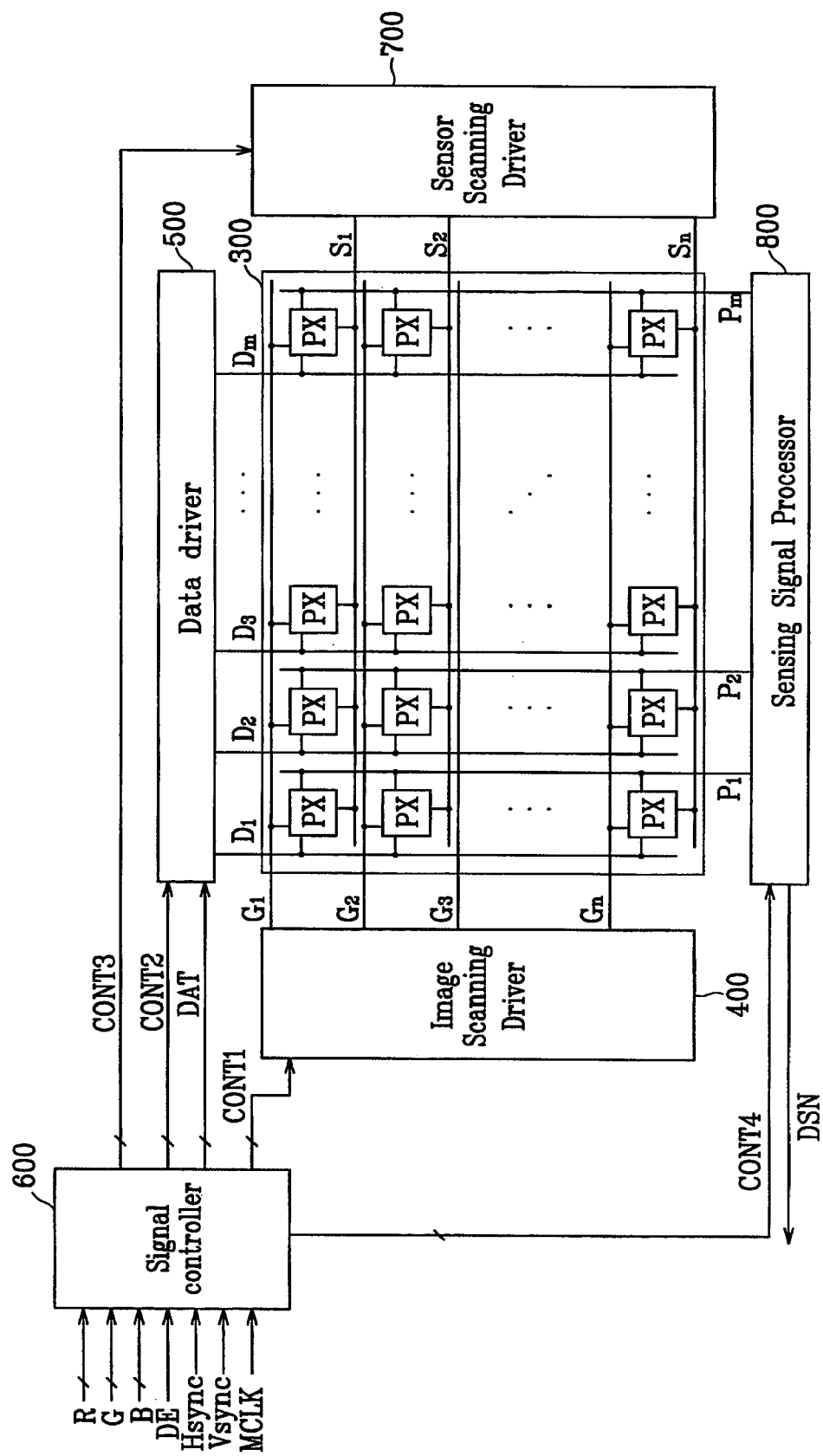
FIG. 1 is a block diagram of an exemplary embodiment of an LCD device according to the present invention.

The present invention now will be described more fully hereinafter with reference to the accompanying drawings, in which preferred embodiments of the invention are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

An exemplary embodiment of a liquid crystal display device according to the present invention will be described in detail with reference to FIGS. 1 and 2.

Figure 2:
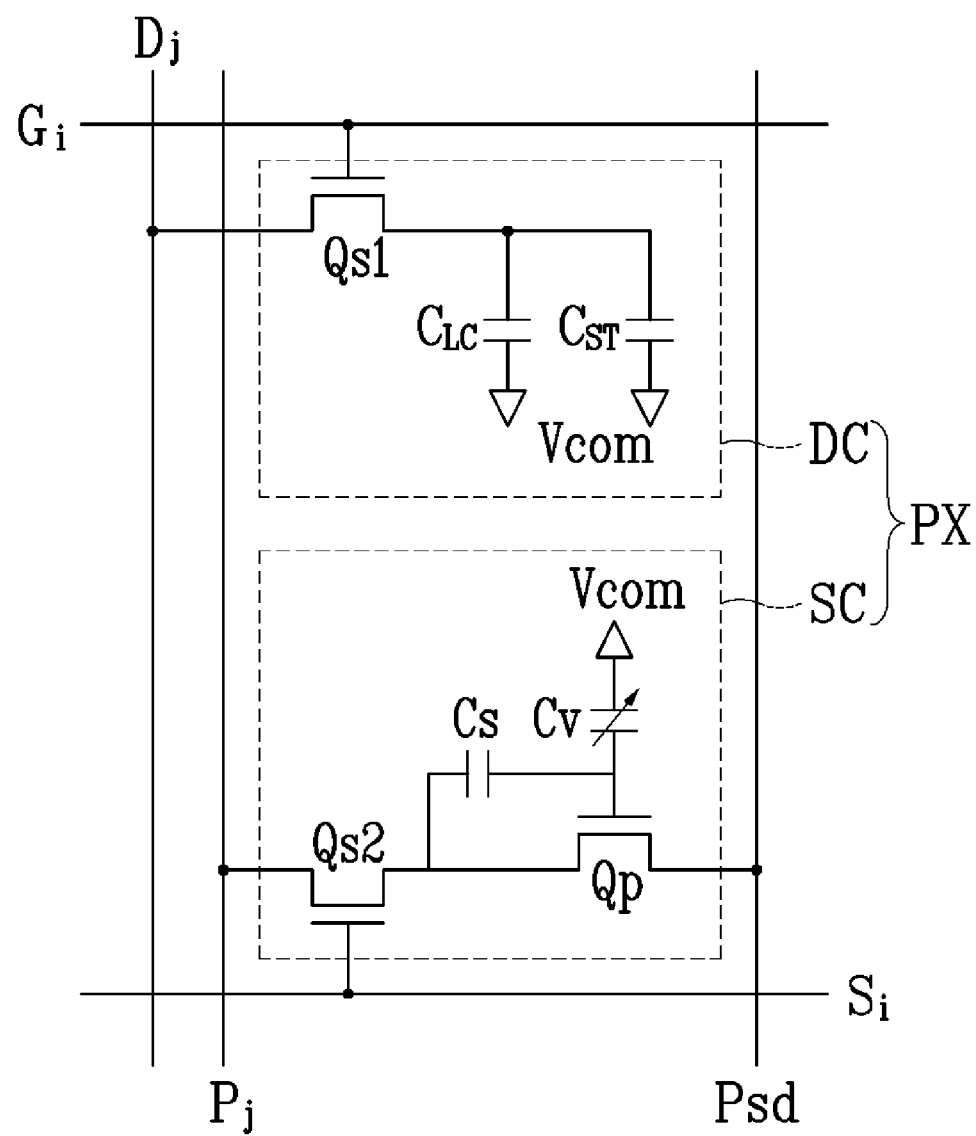
FIG. 2 is an equivalent circuit diagram of an exemplary embodiment of a pixel of an LCD device according to the present invention.
Figure 3:
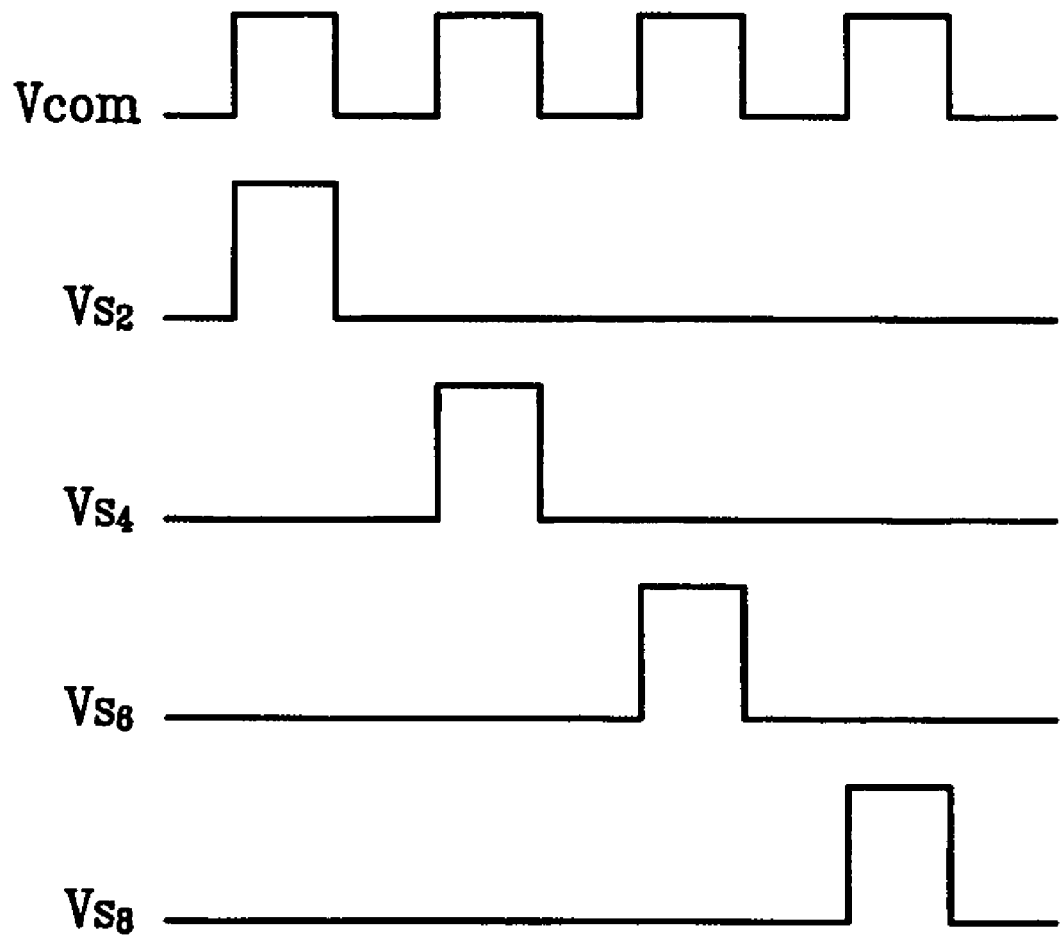
FIG. 3 illustrates exemplary embodiment waveforms of a common voltage and sensor scanning signals according to the present invention.

FIG. 1 is a block diagram of an exemplary embodiment of an LCD device according to the present invention, FIG. 2 is an equivalent circuit diagram of an exemplary embodiment of a pixel of an LCD device according to the present invention, and FIG. 3 illustrates waveforms of a common voltage and sensor scanning signals according to an embodiment of the present invention.

Referring to FIG. 1, an exemplary embodiment of an LCD device includes a liquid crystal (LC) panel assembly 300, an image scanning driver 400, an image data driver 500, a sensor scanning driver 700, and a sensing signal processor 800 that are coupled with the panel assembly 300, and a signal controller 600 controlling the above elements.

Referring to FIGS. 1 and 2, the panel assembly 300 includes a plurality of display signal lines $G_1$-$G_n$ and $D_1$-$D_m$, and a plurality of sensor signal lines $S_1$-$S_n$, $P_1$-$P_m$ and Psd. A plurality of pixels PX are connected to the display signal lines $G_1$-$G_n$ and $D_1$-$D_m$ and the sensor signal lines $S_1$-$S_n$, $P_1$-$P_m$ and Psd. The display signal lines $G_1$-$G_n$ and $D_1$-$D_m$, and the sensor signal lines, $S_1$-$S_n$, $P_1$-$P_m$ and Psd are arranged substantially in a matrix as shown in FIGS. 1 and 2.

The display signal lines include a plurality of image scanning lines $G_1$-$G_n$ transmitting image scanning signals and a plurality of image data lines $D_1$-$D_m$ transmitting image data signals.

The sensor signal lines include a plurality of sensor scanning lines $S_1$-$S_n$ transmitting sensor scanning signals, a plurality of sensor data lines $P_1$-$P_m$ transmitting sensor data signals, and a plurality of input voltage lines Psd.

In the exemplary embodiment, the image scanning lines $G_1$-$G_n$ and the sensor scanning lines $S_1$-$S_n$ extend substantially in a row direction and substantially parallel to each other, while the image data lines $D_1$-$D_m$ and the sensor data lines $P_1$-$P_m$ extend substantially in a column direction and substantially parallel to each other.

The input voltage lines Psd transmit a sensor input voltage and they may be omitted in another exemplary embodiment.

Referring to the exemplary embodiment shown in FIG. 2, each pixel PX, for example, a pixel PX in the i-th row (i=1, 2, . . . , n) and the j-th column (j=1, 2, . . . , m), includes a display circuit DC connected to display signal lines $G_i$ and $D_j$ and a sensing circuit SC connected to sensor signal lines $S_i$, $P_j$ and Psd.

However, in other exemplary embodiments, the sensing circuits SC may be included only in a portion of the pixels PX of the LCD device. In other words, in different embodiments, the concentration of the sensing circuits SC may be varied and thus the number of the sensor scanning lines $S_1$-$S_n$ and the number of the sensor data lines $P_1$-$P_m$ may also be varied.

The display circuit DC in the exemplary embodiment of FIG. 2 includes a switching element Qs1 connected to an image scanning line $G_i$ and an image data line $D_j$. An LC capacitor $C_{LC}$ and a storage capacitor $C_{ST}$ are connected to the switching element Qs1. In other exemplary embodiments, the storage capacitor $C_{ST}$ may be omitted.

The switching element Qs1 has three terminals, i.e., a control terminal connected to the image scanning line $G_i$, an input terminal connected to the image data line $D_j$, and an output terminal connected to the LC capacitor $C_{LC}$ and the storage capacitor $C_{ST}$.

The LC capacitor $C_{LC}$ includes a pair of terminals and a liquid crystal layer (not shown) interposed therebetween and it is connected between the switching element Qs1 and a common voltage Vcom.

The storage capacitor $C_{ST}$ assists the LC capacitor $C_{LC}$ and it is connected between the switching element Qs1 and a predetermined voltage such as the common voltage Vcom.

The sensing circuit SC in the exemplary embodiment of FIG. 2 includes a switching element Qs2 connected to a sensor scanning line $S_i$ and a sensor data line $P_j$, a sensing element Qp connected between the switching element Qs2 and an input voltage line Psd, and a variable capacitor Cv connected between the sensing element Qs2 and the common voltage Vcom.

The variable capacitor Cv has a capacitance that varies in response to an external stimulus such as a user's touch exerted on the panel assembly 300. Examples of the external stimulus include, but are not limited to, pressure and light. The capacitance can also be varied by modifying the configuration of the variable capacitor Cv, including but not limited to, changing a distance between two terminals of the variable capacitor Cv under the pressure. For example, when a user touches the panel assembly 300, an amount of light incident on the panel assembly 300 may be changed as well as the pressure.

The sensing element Qp has three terminals, i.e., a control terminal connected to the variable capacitor Cv, an output terminal connected to the switching element Qs2, and an input terminal connected to the sensor input voltage line Psd. The sensing element Qp generates and outputs a sensing current having a magnitude depending on a voltage of its control terminal. The voltage of the control terminal depends on the capacitance of the variable capacitor Cv and the magnitude of the common voltage Vcom. In an alternative embodiment, the sensing element Qp may generate a photocurrent in response to incident light. In this case, the photocurrent may be included in the sensing current.

The sensing circuit may further include a sensor capacitor Cs connected between the control terminal and the output terminal of the sensing element Qp. The sensor capacitor Cs stores electrical charges output from the sensing element Qp to maintain a predetermined voltage.

The switching element Qs2 also has three terminals, i.e., a control terminal connected to the sensor scanning line $S_i$, an output terminal connected to the sensor data line $P_j$, and an input terminal connected to the output terminal of the sensing element Qp. The switching element Qs2 outputs a sensor data signal to the sensor data line $P_j$ in response to the sensor scanning signal from the sensor scanning line $S_i$. The sensor data signal may be a voltage stored in the sensor capacitor Cs or the sensing current from the sensing element Qp.

The switching elements Qs1 and Qs2 and the sensing element Qp may include, but are not limited to, amorphous silicon or polysilicon thin film transistors (TFTs).

One or more polarizers (not shown) are provided at the panel assembly 300.

The image scanning driver 400 is connected to the image scanning lines $G_1$-$G_n$ of the panel assembly 300 and synthesizes a first high-level voltage Von1 for turning on the switching element Qs1 and a first low-level voltage Voff1 for turning off the switching element Qs1 to generate the image scanning signals for application to the image scanning lines $G_1$-$G_n$.

The image data driver 500 is connected to the image data lines $D_1$-$D_m$ of the panel assembly 300 and applies image data signals to the image data lines $D_1$-$D_m$.

The sensor scanning driver 700 is connected to the sensor scanning lines $S_1$-$S_n$ of the panel assembly 300 and synthesizes a second high-level voltage Von2 for turning on the switching element Qs2 and a second low-level voltage Voff2 for turning off the switching element Qs2 to generate the sensor scanning signals for application to the sensor scanning lines $G_1$-$G_n$.

The sensing signal processor 800 is connected to the sensor data lines $P_1$-$P_m$ of the display panel 300 and receives and processes the sensor data signals from the sensor data lines $P_1$-$P_m$.

In alternative embodiments, the drivers 400, 500 and 700 and the sensing signal processor 800 may be implemented with at least one integrated circuit (IC) chip (not shown) mounted on the LC panel assembly 300 or on a flexible printed circuit (FPC) film in a tape carrier package (TCP) type, which are attached to the panel assembly 300. Alternately, the drivers 400, 500 and 700 and the sensing signal processor 800 may be integrated into the panel assembly 300 along with the signal lines $G_1$-$G_n$, $D_1$-$D_m$, $S_1$-$S_n$, $P_1$-$P_m$ and Psd, the switching elements Qs1 and Qs2, and the sensing elements Qp.

The signal controller 600 in the exemplary embodiment of FIG. 1 controls the image scanning driver 400, the image data driver 500, the sensor scanning driver 700, and the sensing signal processor 800, etc.

Now, the operation of the above-described exemplary LCD will be described in detail with reference to FIGS. 1 and 2.

The signal controller 600 is supplied with input image signals R, G and B and input control signals for controlling the display thereof from an external graphics controller (not shown). The input control signals may include, but are not limited to, a vertical synchronization signal Vsync, a horizontal synchronization signal Hsync, a main clock MCLK, and a data enable signal DE.

On the basis of the input control signals and the input image signals R, G and B, the signal controller 600 generates image scanning control signals CONT1, image data control signals CONT2, sensor scanning control signals CONT3, and sensor data control signals CONT4. The signal controller 600 processes the image signals R, G and B suitable for the operation of the display panel 300, the processed image signals shown as DAT in FIG. 1. The signal controller 600 sends the scanning control signals CONT1 to the image scanning driver 400, the processed image signals DAT and the data control signals CONT2 to the data driver 500, the sensor scanning control signals CONT3 to the sensor scanning driver 700, and the sensor data control signals CONT4 to the sensing signal processor 800.

The image scanning control signals CONT1 include an image scanning start signal STV as an instruction to start image scanning, and at least one clock signal for controlling the output time of the first high-level voltage Von. In alternative embodiments, the image scanning control signals CONT1 may include, but are not limited to, an output enable signal OE for defining the duration of the first high-level voltage Von.

The image data control signals CONT2 include a horizontal synchronization start signal STH for indicating the start of image data transmission for a group of pixels PX, a load signal LOAD for instructing to apply the image data signals to the image data lines $D_1$-$D_m$, and a data clock signal HCLK. In alternative embodiments, the image data control signal CONT2 may further include, but is not limited to, an inversion signal RVS for reversing the polarity of the image data signals (with respect to the common voltage Vcom).

Responsive to the image data control signals CONT2 from the signal controller 600, the data driver 500 receives a packet of the digital image signals DAT for the group of pixels PX from the signal controller 600, converts the digital image signals DAT into analog image data signals, and applies the analog image data signals to the image data lines $D_1$-$D_m$.

The image scanning driver 400 applies the first high-level voltage Von1 to an image scanning line $G_1$-$G_n$ in response to the image scanning control signals CONT1 from the signal controller 600, thereby turning on the switching transistors Qs1 connected thereto. The image data signals applied to the image data lines $D_1$-$D_m$ are then supplied to the display circuit DC of the respective pixels PX through the activated switching transistors Qs1 as shown in FIG. 2.

The difference between the voltage of an image data signal and the common voltage Vcom is represented as a voltage across the LC capacitor $C_{LC}$, which is referred to as a pixel voltage. The LC molecules in the LC capacitor $C_{LC}$ have orientations depending on the magnitude of the pixel voltage. The molecular orientations determine the polarization of light passing through the LC layer 3 shown in FIGS. 6 and 7. The polarizer(s) converts the light polarization into the light transmittance to display images.

By repeating this procedure by a unit of a horizontal period (also referred to as "1H" and equal to one period of the horizontal synchronization signal Hsync and the data enable signal DE), all image scanning lines $G_1$-$G_n$ are sequentially supplied with the first high-level voltage Von, thereby applying the image data signals to all pixels PX to display an image for a frame.

When the next frame starts after one frame finishes, the inversion control signal RVS applied to the data driver 500 is controlled such that the polarity of the image data signals is reversed (which is referred to as "frame inversion"). In alternative embodiments, the inversion control signal RVS may also be controlled such that the polarity of the image data signals flowing in a data line are periodically reversed during one frame (for example, row inversion and dot inversion), or the polarity of the image data signals in one packet are reversed (for example, column inversion and dot inversion).

The sensor scanning driver 700 applies the second high-level voltage Von2 to the sensor scanning lines $S_1$-$S_m$ to turn on the switching elements Qs2 connected thereto in response to the sensing control signals CONT3. Then, the switching elements Qs2 output the sensor data signals to the sensor data lines $P_1$-$P_m$, and the sensor data signals are inputted into the sensing signal processor 800.

The sensor scanning may be performed by various schemes and an exemplary embodiment thereof is illustrated in FIG. 3.

As shown in FIG. 3, the common voltage Vcom swings between a third high-level voltage and a third low-level voltage in a period of 2 H. As the sensor scanning driver 700 performs the sensor scanning, the sensor scanning signals ($Vs_2$, $Vs_4$, $Vs_6$, . . . ) of even sensor scanning lines ($S_2$, $S_4$, $S_6$, . . . ) sequentially become equal to the second high-level voltage when the common voltage Vcom is equal to the third high-level voltage.

With reference to FIG. 3, the sensor scanning driver 700 performs the sensor scanning when the common voltage Vcom is equal to the third low-level voltage. Here, only odd sensor scanning lines ($S_1$, $S_3$, $S_5$, . . . ) are scanned, In other words, all the sensor scanning lines $S_1$-$S_n$ are scanned regardless of the magnitude of the common voltage Vcom. Furthermore, in alternative embodiments, the common voltage Vcom may be a constant direct voltage.

The sensing signal processor 800 amplifies or filters the read sensor data signals and converts the analog sensor data signals into digital sensor data signals DSN to be sent to the signal controller 600 in response to the sensor data control signals CONT4, as shown in the exemplary embodiment of FIG. 1. The signal controller 600 appropriately processes signals from the sensing signal processor 800 to determine whether and where a touch exists. The signal controller 600 sends information about the touch to (external) devices (not shown) that may demand the information. In alternative embodiments, an external device may send image signals generated based on the information to the LCD.

In other alternative embodiments, the first and the second high-level voltages may be higher than about 10V, and the first and the second low-level voltages may be lower than about −5V. For example, the high-level voltages may be equal to about 15V and the low-level voltages may be equal to about −12V. The third high-level voltage may be equal to about 5V, and the third low-level voltage may be equal to about 0V. The sensor input voltage may range between about −15V−+15V during the sensing operation, and may be, for example, equal to about 15V. The output voltage of the sensing elements Qp in absence of a touch may range between about 0V-5V, and may be, for example, about 1.0V. The control terminal voltage of the sensing elements Qp may range between about 0V-3V.

Accordingly, the voltage difference Vgs between the control terminal and the input terminal of a sensing element Qp may range between about −16V-+2V under normal operating condition of the sensing elements Qp. The voltage difference Vds between the input terminal and the output terminal may range between about 3V-14V under normal operating condition of the sensing elements Qp.

Now, detailed structures of exemplary embodiments of LC panel assemblies will be described in detail with reference to FIGS. 4, 5, 6 and 7.

Figure 4:
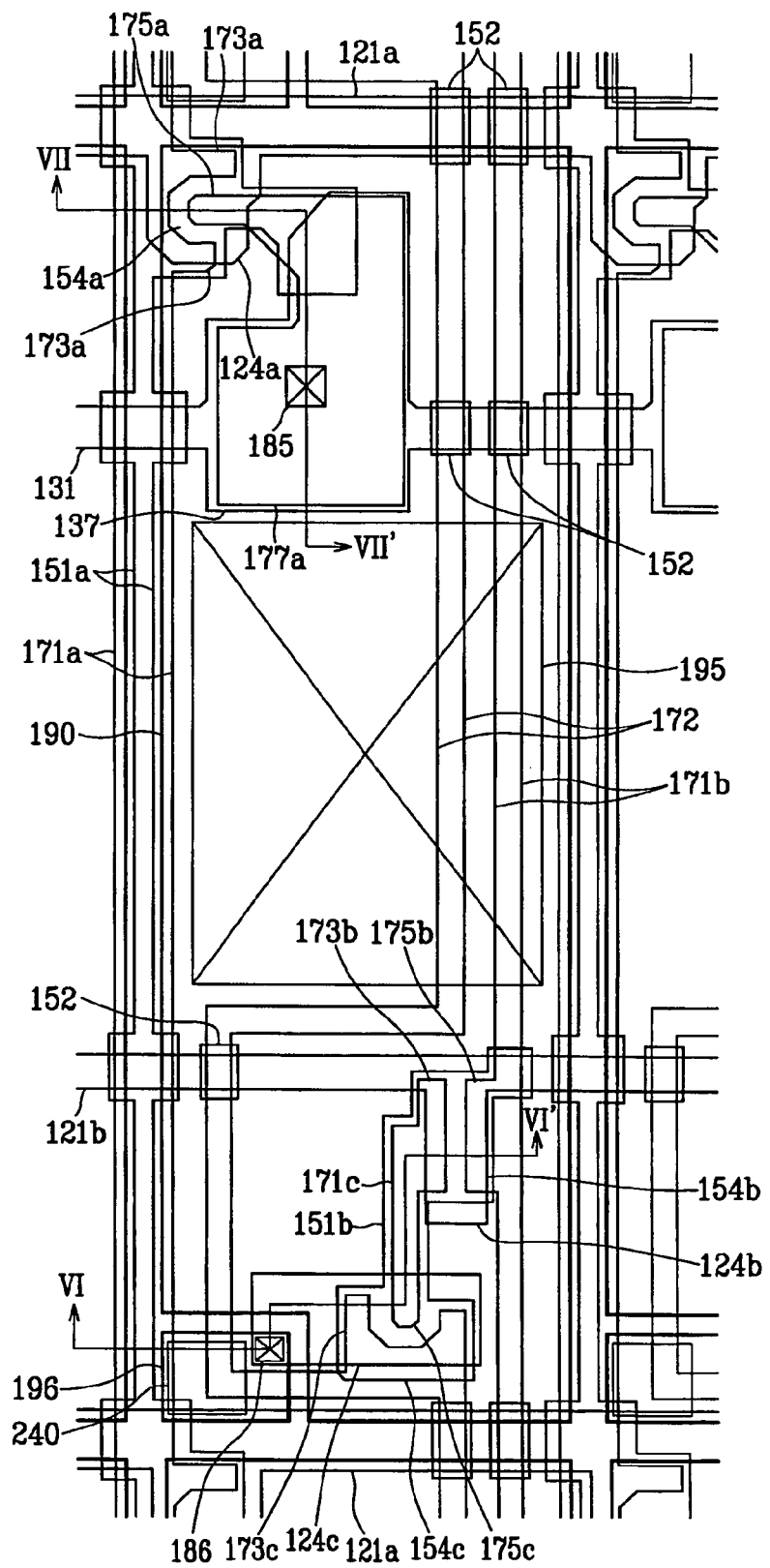
FIG. 4 is a layout view of an exemplary embodiment of a LC panel assembly according to the present invention.
Figure 5:
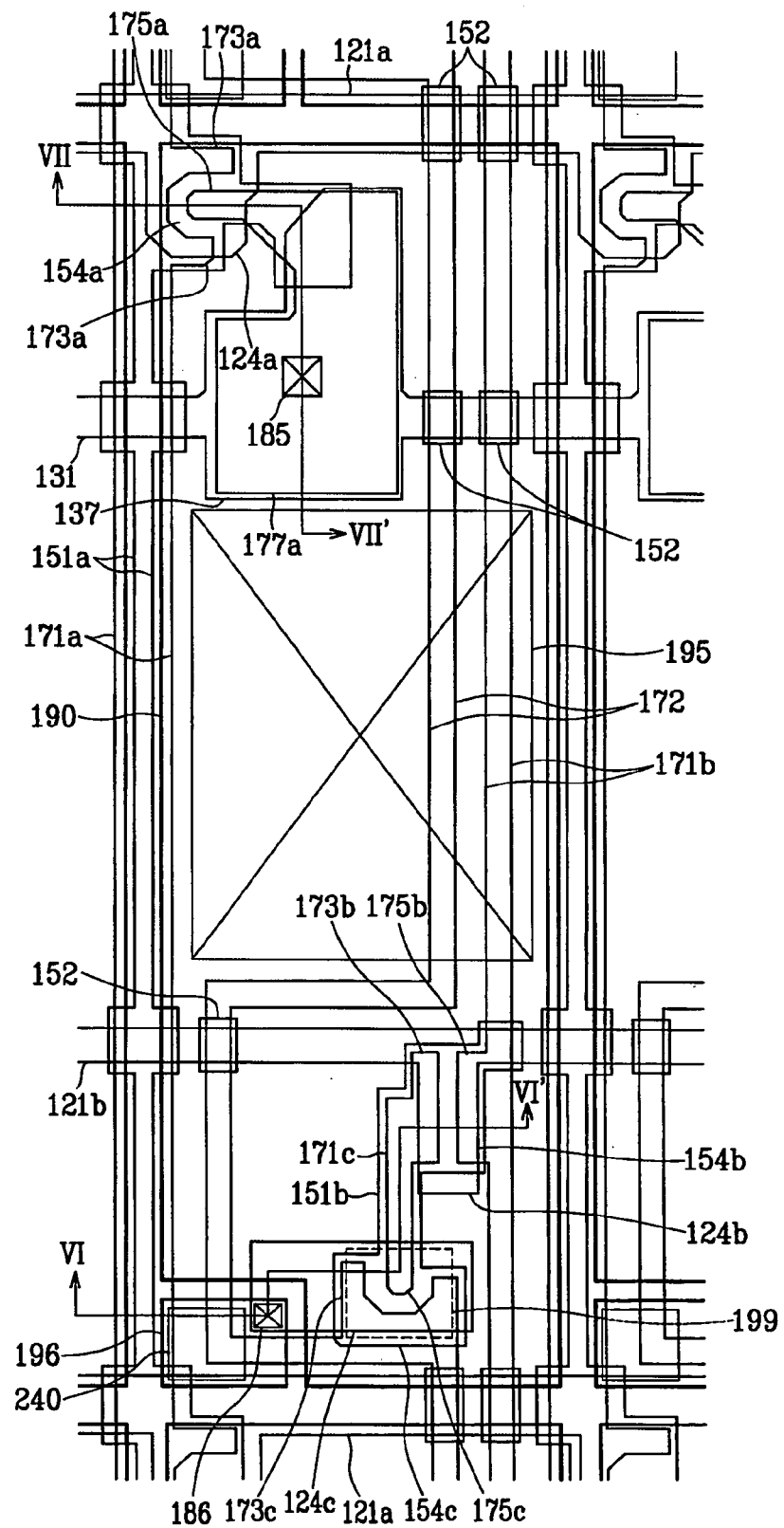
FIG. 5 is a layout view of another exemplary embodiment of a LC panel assembly according to the present invention.

FIG. 4 is a layout view of an exemplary LC panel assembly according to the present invention, FIG. 5 is a layout view of another exemplary LC panel assembly according to the present invention, FIG. 6 is a sectional view of the exemplary panel assemblies shown in FIGS. 4 and 5 taken along line VI-VI', and FIG. 7 is a sectional view of the exemplary panel assemblies shown in FIGS. 4 and 5 taken along line VII-VII'.

Each of the exemplary LC panel assemblies includes a TFT array panel 100, a common electrode panel 200 facing the TFT array panel, and an LC layer 3 interposed between the panels 100 and 200 as best shown in FIGS. 6 and 7.

The TFT array panel 100 includes a plurality of gate conductors including a plurality of image scanning lines 121a including first control electrodes 124a, a plurality of storage electrode lines 131, a plurality of sensor scanning lines 121b including second control electrodes 124b, and a plurality of third control electrodes 124c are formed on an insulating substrate 110. The substrate 110 may include, but is not limited to, transparent glass or plastic.

The image scanning lines 121a transmit image scanning signals and the sensor scanning lines 121b transmit sensor scanning signals. The scanning lines 121a and 121b extend substantially in a transverse direction and the first and the second control electrodes 124a and 124b project downward, as best shown in FIGS. 4 and 5.

The storage electrode lines 131 are supplied with a predetermined voltage such as a common voltage and extend substantially parallel to the image scanning lines 121a. Each of the storage electrode lines 131 may be disposed close to an image scanning line 121a, while not necessary to. The storage electrode lines 131 include a plurality of storage electrodes 137 expanding upward and downward.

The third control electrodes 124c are separated from the scanning lines 121a and 121b and the storage electrode lines 131 and disposed opposite the storage electrode lines 131 with respect to the sensor scanning lines 121b.

The gate conductors 121a, 121b, 124c and 131 are, for example, made of Al containing metal including, but not limited to, Al and Al alloy, Ag containing metal including, but not limited to, Ag and Ag alloy, Cu containing metal including, but not limited to, Cu and Cu alloy, Mo containing metal including, but not limited to, Mo and Mo alloy, Cr, Ta, or Ti.

However, in alternate embodiments, all or a portion of the gate conductors 121a, 121b, 124c and 131 may have a multi-layered structure including two conductive films (not shown) having different physical characteristics. One of the two films may be made of low resistivity metal including, but not limited to, Al containing metal, Ag containing metal, and Cu containing metal, or the like, including any combination of at least one of the foregoing, for reducing signal delay or voltage drop. The other film may be made of material including, but not limited to, Mo containing metal, Cr, Ta, or Ti, which has good physical, chemical, and electrical contact characteristics with other materials including, but not limited to, indium tin oxide (ITO) or indium zinc oxide (IZO). For example, combinations of the two films may include a lower Cr film and an upper Al (alloy) film, and a lower Al (alloy) film and an upper Mo (alloy) film. However, in other alternative embodiments, the gate conductors 121a, 121b, 124c and 131 may be made of various metals or conductors.

The lateral sides of the gate conductors 121a, 121b, 124c and 131 are inclined relative to a surface of the substrate 110, and the inclination angle thereof ranges, for example, about 30-80 degrees as best shown in FIG. 6.

A gate insulating layer 140 may be made of materials including, but not limited to, silicon nitride (SiNx) or silicon oxide (SiOx) and is formed on the gate conductors 121a, 121b, 124c and 131.

A plurality of semiconductor stripes 151a and a plurality of semiconductor islands 151b and 152 are formed on the gate insulating layer 140. The semiconductor stripes and islands 151a, 151b and 152 are, for example, made of materials including, but not limited to, hydrogenated amorphous silicon (abbreviated to "a-Si") or polysilicon.

The semiconductor stripes 151a extend substantially in a longitudinal direction and become wide near the scanning lines 121a and 121b and the storage electrode lines 131 such that the semiconductor stripes 151a cover large areas of the scanning lines 121a and 121b and the storage electrode lines 131. Each of the semiconductor stripes 151a has a plurality of first expansions 154a disposed on the first control electrodes 124a.

Each of the semiconductor islands 151b includes second and third expansions 154b and 154c disposed on the second and third control electrodes 124b and 124c, respectively. Each of the semiconductor islands 151b may further include an extension covering edges of the sensor scanning lines 121b.

The semiconductor islands 152 are disposed on the scanning lines 121a and 121b and the storage electrode lines 131.

A plurality of ohmic contact stripes 161a and a plurality of first ohmic contact islands 165a are formed on the semiconductor stripes 151a, and a plurality of second, third, and fourth ohmic contact islands 165b, 163c and 161b are formed on the semiconductor islands 151b. In addition, a plurality of other ohmic contact islands (not shown) are formed on the semiconductor islands 152. The ohmic contacts 161a, 161b, 163c, 165a and 165b are, for example, made of materials including, but not limited to, silicide or n+ hydrogenated a-Si heavily doped with n type impurity such as phosphorous.

Each of the ohmic contact stripes 161a includes a plurality of first projections 163a. The first projections 163a and the first ohmic contact islands 165a are located in pairs on the first expansions 154a of the semiconductor stripes 151a.

Each of the fourth ohmic contact islands 161b includes a plurality of second and third projections 163b and 165c. The second projections 163b and the second ohmic contact islands 165b are located in pairs on the second expansions 154b of the semiconductor islands 151b, and the third ohmic contact islands 163c and the third projections 165c are located in pairs on the third expansions 154c of the semiconductor islands 151b.

The lateral sides of the semiconductor stripes and islands 151a, 151b and 152 and the ohmic contacts 161a, 161b, 163c, 165a and 165b are inclined relative to the surface of the substrate 110, and the inclination angles thereof are, for example, in a range of about 30-80 degrees.

A plurality of data conductors including a plurality of image data lines 171a, a plurality of sensor data lines 171b, a plurality of electrode members 171c, a plurality of input voltage lines 172, and a plurality of first output electrodes 175a are formed on the ohmic contacts 161a, 161b, 163c, 165a and 165b and the gate insulating layer 140.

The image data lines 171a transmit image data signals and extend substantially in the longitudinal direction to intersect the scanning lines 121a and 121b and the storage electrode lines 131. Each of the image data lines 171a includes a plurality of first input electrodes 173a projecting toward the first control electrodes 124a.

The first output electrodes 175a are separated from the data lines 171a and 171b and the input voltage lines 172 and disposed opposite the first input electrodes 173a with respect to the first control electrodes 124a. Each of the first output electrodes 175a includes a wide end portion 177a and a narrow end portion. The wide end portion 177a overlaps a storage electrode 137 and the narrow end portion is partly enclosed by a first input electrode 173a that has, for example, a curved shape.

The sensor data lines 171b transmit sensor data signals and extend substantially in the longitudinal direction to intersect the scanning lines 121a and 121b and the storage electrode lines 131. Each of the sensor data lines 171b includes a plurality of second output electrodes 175b projecting toward the second control electrodes 124b.

The electrode members 171c are separated from the data lines 171a and 171b and the input voltage lines 172. Each of the electrode members 171c is disposed on an ohmic contact 161b and includes a second input electrode 173b and a third output electrode 175c disposed on the projections 163b and 165c, respectively. The second input electrode 173b faces a second output electrode 175b.

The input voltage lines 172 transmit a sensor input voltage and extend substantially in the longitudinal direction to intersect the scanning lines 121a and 121b and the storage electrode lines 131. Each of the input voltage lines 172 curves around the electrode members 171c and includes a plurality of third input electrodes 173c projecting toward the third control electrodes 124c. The third input electrodes 173c are disposed opposite the third output electrodes 175c with respect to the third control electrodes 124c. The third input electrodes 173c each have a curved shape, for example, a U-shape, to partly enclose the third output electrodes 175c.

A first control electrode 124a, a first input electrode 173a, and a first output electrode 175a along with a first expansion 154a of a semiconductor stripe 151a form a switching TFT Qs1 having a channel formed in the first expansion 154a disposed between the first input electrode 173a and the first output electrode 175a.

A second control electrode 124b, a second input electrode 173b, and a second output electrode 175b along with a second expansion 154b of a semiconductor island 151b form a switching TFT Qs2 having a channel formed in the second expansion 154b disposed between the second input electrode 173b and the second output electrode 175b.

A third control electrode 124c, a third input electrode 173c, and a third output electrode 175c along with a third expansion 154c of a semiconductor island 151b form a sensor TFT Qp having a channel formed in the third expansion 154c disposed between the third input electrode 173c and the third output electrode 175c.

The data conductors 171a, 171b, 171c, 172 and 175a are, for example, made of refractory metal including, but not limited to, Cr, Mo, Ta, Ti, or alloys thereof.

However, in alternative embodiments, all or a portion of the data conductors 171a, 171b, 171c, 172 and 175a may have a multilayered structure including a refractory metal film (not shown) and a low resistivity film (not shown). For example, the multi-layered structure may be a double-layered structure including a lower Cr/Mo (alloy) film and an upper Al (alloy) film. In another example, the multi-layered structure may be a triple-layered structure of a lower Mo (alloy) film, an intermediate Al (alloy) film, and an upper Mo (alloy) film. However, in alternative embodiments, the data conductors 171a, 171b, 171c, 172 and 175a may be made of various metals or conductors.

The data conductors 171a, 171b, 171c, 172 and 175a may have inclined edge profiles, and the inclination angles thereof range, for example, about 30-80 degrees.

The ohmic contacts 161a, 161b, 163c, 165a and 165b may be interposed only between the underlying semiconductor stripes and islands 151a, 151b and 152 and the overlying data conductors 171a, 171b, 171c, 172 and 175a thereon and reduce the contact resistance therebetween, but in alternative embodiments, they ohmic contacts may not be interposed only between the underlying semiconductor stripes and islands.

Although the semiconductor stripes 151a are narrower than the image data lines 171a at most places in the exemplary embodiment, the width of the semiconductor stripes 151a becomes larger near the scanning lines 121a and 121b and the storage electrode lines 131 as described above, to smooth the profile of the surface. This smoothing thereby prevents the disconnection of the image data lines 171a and the input voltage lines 172. Likewise, the semiconductor islands 152 and the extensions of the semiconductor islands 151b disposed on the edges of the scanning lines 121a and 121b and the storage electrode lines 131 to smooth the profile of the surface to prevent the disconnection of the sensor data lines 171b and the input voltage lines 172 there.

The semiconductor stripes and islands 151a, 151b and 152 may include some exposed portions, which are not covered with the data conductors 171a, 171b, 171c, 172 and 175a such as portions located between the input electrodes 173a-173c and the output electrodes 175a-175c.

A passivation layer 180 is formed on the data conductors 171a, 171b, 171c, 172 and 175a, and the exposed portions of the semiconductor stripes and islands 151a, 151b and 152. The passivation layer 180 of this embodiment includes a lower passivation film 180p and an upper passivation film 180q. The lower passivation film 180p is, for example, made of material including, but not limited to, inorganic insulator such as silicon nitride or silicon oxide and the like. The upper passivation film 180q, for example, made of material including, but not limited to, organic insulator. The organic insulator has a dielectric constant, for example, less than about 4.0, and it may have photosensitivity. The upper passivation film 180q, which may have unevenness on its surface, may have a plurality of openings exposing portions of the lower passivation film 180p. In exemplary embodiments, the passivation layer 180 may have a single-layer structure preferably made of, for example, inorganic or organic insulator, or the like.

The passivation layer 180 has a plurality of contact holes 185 exposing the expansions 177a of the first output electrodes 175a. The passivation layer 180 and the gate insulating layer 140 may also have a plurality of contact holes 186 exposing the third control electrodes 124c as best shown in FIG. 6. In alternative embodiments, the contact holes 185 and 186 may have inclined or stepped sidewalls.

A plurality of pixel electrodes 190 and a plurality of sensing electrodes 196 are formed on the passivation layer 180.

Each of the pixel electrodes 190 has unevenness following the unevenness of the upper passivation film 180q. Each of the pixel electrodes 190 includes a transparent electrode 192 and a reflective electrode 194 disposed thereon as shown in the exemplary embodiments of FIGS. 6 and 7. The transparent electrode 192 may be made of material including, but not limited to, transparent conductor such as ITO or IZO, and the like. The reflective electrode 194 may be made of material including, but not limited to, Al, Ag, Cr, or alloys thereof.

However, in alternative embodiments, the reflective electrode 194 may have a dual-layered structure including a low-resistivity, reflective upper film (not shown) made of material including, but not limited to, Al, Ag, or alloys thereof, and a good contact lower film (not shown) made of material including, but not limited to, Mo containing metal, Cr, Ta, or Ti having good contact characteristics with ITO or IZO.

The reflective electrode 194 has a transmissive window 195 disposed in an opening of the upper passivation film 180q and exposing the transparent electrode 192. In addition, the reflective electrode 194 may have an opening 199 disposed on a sensor TFT Qp, as shown in FIG. 5.

The pixel electrodes 190 are physically and electrically connected to the first output electrodes 175a through the contact holes 185 such that the pixel electrodes 190 receive data voltages from the first output electrodes 175a. The pixel electrodes 190 supplied with the image data voltages generate electric fields in cooperation with a common electrode 270 of the common electrode panel 200 supplied with a common voltage Vcom. These voltages determine the orientations of liquid crystal molecules of the liquid crystal layer 3 disposed between the two electrodes 190 and 270. A pixel electrode 190 and the common electrode 270 form an LC capacitor $C_{LC}$, which stores applied voltages after the switching TFT Qs1 turns off.

A pixel of the panel assembly 300, including the TFT array panel 100, the common electrode panel 200, and the LC layer 3, may be divided into a transmissive region TA and a reflective region RA defined by a transparent electrode 192 and a reflective electrode 194, respectively. In detail, the transmissive region TA includes portions disposed on and under the transmissive windows 195, while the reflective region RA includes portions disposed on and under the reflective electrodes 194.

In the transmissive region TA, light incident from a rear surface of the panel assembly 300, i.e., from the TFT array panel 100, passes through the LC layer 3 and goes out of a front surface, i.e., out of the common electrode panel 200, thereby displaying images. In the reflective regions RA, light incident from the front surface enters into the LC layer 3, is reflected by the reflective electrode 194, passes through the LC layer 3 again, and goes out of the front surface, thereby displaying images. In exemplary embodiments where there is unevenness of the reflective electrode 194, the efficiency of the light reflection is enhanced.

A pixel electrode 190 and an expansion 177a of a first output electrode 175a connected thereto overlap a storage electrode line 131 including a storage electrode 137 to form a storage capacitor $C_{ST}$, which enhances the voltage storing capacity of the liquid crystal capacitor.

The pixel electrodes 190 overlap the scanning lines 121a and 121b, the data lines 171a and 171b, the input voltage lines 172, and the TFTs Qs1, Qs2 and Qp to increase the aperture ratio.

Each of the sensing electrodes 196 also includes a transparent electrode 197 and a reflective electrode 198. The transparent electrode 197 may be made of the same layer as the transparent electrodes 192 of the pixel electrodes 190. The reflective electrode 198 may be made of the same layer as the reflective electrodes 194 of the pixel electrodes 190. Each of the sensing electrodes 196 is spaced apart from a pixel electrode 190 adjacent thereto by a distance, for example, larger than about three microns. However, in alternative embodiments, the sensing electrodes 196 may be made of the same layer as the data conductors 171a, 171b, 171c, 172 and 175a.

The sensing electrodes 196 are physically and electrically connected to the third control electrodes 124c through the contact holes 186. The sensing electrodes 196 and the third control electrodes 124c are electrically floating. A sensing electrode 196 and the common electrode 270 form a variable capacitor Cv with interposing the LC layer 3 therebetween.

The description of the common electrode panel 200 in the exemplary LC panel as shown in FIGS. 6 and 7 will follow.

A light blocking member 220 referred to as a black matrix for preventing light leakage is formed on an insulating substrate 210, which may include but is not limited to transparent glass or plastic. The light blocking member 220 defines a plurality of open areas facing the pixel electrodes 190.

A plurality of color filters 230 are formed on the substrate 210 and they are disposed substantially in the open areas enclosed by the light blocking member 220. In alternative embodiments, the color filters 230 may extend substantially along the longitudinal direction along the pixel electrodes 190 to form stripes. Each of the color filters 230 may represent one of the primary colors such as red, green and blue colors.

An overcoat 250 is formed on the color filters 230 and the light blocking member 220. The overcoat 250 is, for example, made of (organic) insulator. The overcoat 250 protects the color filters 230, prevents the color filters 230 from being exposed, and provides a flat surface.

A plurality of risings 240 are formed on the overcoat 250. The risings 240 are, for example, made of organic insulator and face the sensing electrodes 196 on the TFT array panel 100 as shown in FIG. 6.

A common electrode 270 is formed on the overcoat 250 and the risings 240. The common electrode 270 is, for example, made of transparent conductive material including, but not limited to, ITO and IZO. In alternative embodiments, the common electrode 270 may include portions disposed between the risings 240 and the overcoat 250. This configuration may be obtained by depositing transparent conductor both before and after the formation of the risings 240. In other embodiments, the thickness of the transparent conductor deposited after the formation of the risings 240 may be in a range of about 10-300 nm.

Alignment layers 11 and 21 for aligning the LC layer 3 are coated on inner surfaces of the panels 100 and 200, and one or more polarizers (not shown) are provided on outer surfaces of the panels 100 and 200.

In alternative embodiments, the LC layer 3 may be subjected to a homeotropic alignment or a homogeneous alignment. In these embodiments, the thickness of the LC layer 3 in the transmissive regions TA may be about twice in the reflective regions RA since there is no upper passivation in the transmissive regions TA. The thickness of the LC layer 3 between the sensing electrodes 196 and the risings 240 may be about 0.01-2.0 microns, which is relatively small as compared with the thickness of other portions in the reflective regions RA.

In the exemplary embodiment, the panel assembly 300 further includes a plurality of elastic spacers 320 for forming a gap between the TFT array panel 100 and the common electrode panel 200 as best shown in FIG. 7. The spacers 320 may be spherical or ellipsoidal beads and spread over the panel assembly 300. However, in alternative embodiments, the spacers 320 may be columnar or rigid spacers arranged in a regular manner.

In other alternative embodiments, the panel assembly 300 may further include a sealant (not shown) for combining the TFT array panel 100 and the common electrode panel 200. In these embodiments, the sealant may disposed around edges of the common electrode panel 200.

Now, the operation of the exemplary variable capacitors will be described in detail with reference to FIGS. 8A and 8B as well as FIGS. 4-7.

Figure 8A:
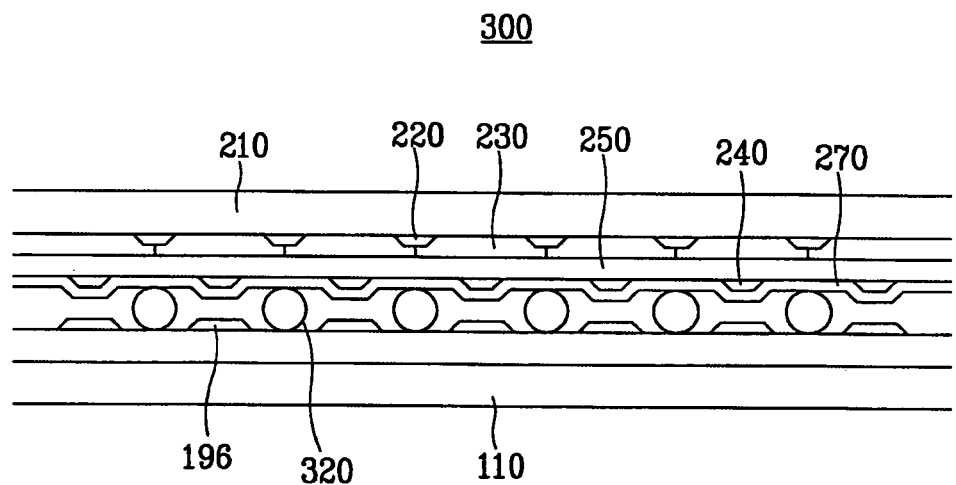
FIGS. 8A and 8B are schematic sectional views of the panel assembly shown in FIGS. 4-7 without and with a touch.
Figure 8B:
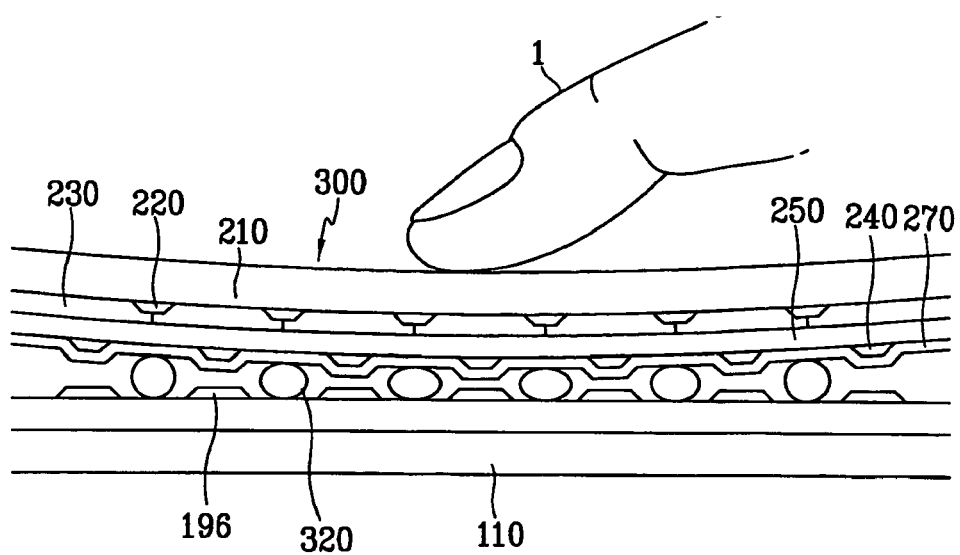

FIGS. 8A and 8B are schematic sectional views of the exemplary panel assembly shown in FIGS. 4-7, FIG. 8A showing without a touch and FIG. 8B showing with a touch.

FIG. 8A shows the exemplary panel assembly 300 without any touch. A TFT array panel 100 and a common electrode panel 200 are propped by a plurality of spacers 320, and thus the distance between the common electrodes 270 and the sensing electrodes 196 is kept substantially constant.

FIG. 8B shows the panel assembly 300 upon pressed by a finger 1 of a user. The spacers 320 are deformed by the pressure given by the finger 1 and thus the common electrode panel 200 approaches the TFT array panel 100 near the pressed point. Accordingly, the distance between the common electrode 270 and the sensing electrodes 196 is reduced.

The capacitance of a variable capacitor Cv including a sensing electrode 196 and a portion of the common electrode 270 (which will be denoted by the same reference character Cv as the capacitor itself) corresponding thereto is given by:

$$Cv = \varepsilon \frac{A}{d}, \quad (1)$$

where $\varepsilon$ denotes the permittivity of the LC layer 3 and the alignment layers 11 and 21, A denotes the area of the sensing electrode 196, and d is the distance between the sensing electrode 196 and the common electrode 270 on a rising 240.

Since the permittivity $\varepsilon$ and the area A are considered to be fixed, the capacitance of the variable capacitor Cv is determined by the distance d. For example, the distance d becomes equal to about 0.1 microns from 0.5 microns by a touch, the capacitance Cv increases about five times.

The variation of the capacitance Cv changes the voltage across the variable capacitor Cv and a voltage of the control terminal of a sensing element Qp, i.e., a control voltage, which in turn changes the sensor current of the sensing element Qp.

In the meantime, a semiconductor channel of a sensor TFT Qp shown in FIG. 5 is exposed to light through an opening 199 and the semiconductor channel generates a photocurrent upon the exposure to the light. Accordingly, the sensor current outputted by the sensing element Qp includes the photocurrent.

When a user's finger 1 approaches the panel assembly 300 and covers the openings 199, the amount of light incident on the channel of the sensor TFTs Qp is reduced to decrease the photocurrent and the sensor current.

In this way, a touch of a user's finger 1, etc., on the panel assembly 300 changes sensor data signals to inform whether and where a touch exists.

An exemplary embodiment of an LCD device according to the present invention will be described in detail with reference to FIGS. 9 and 10.

Figure 9:
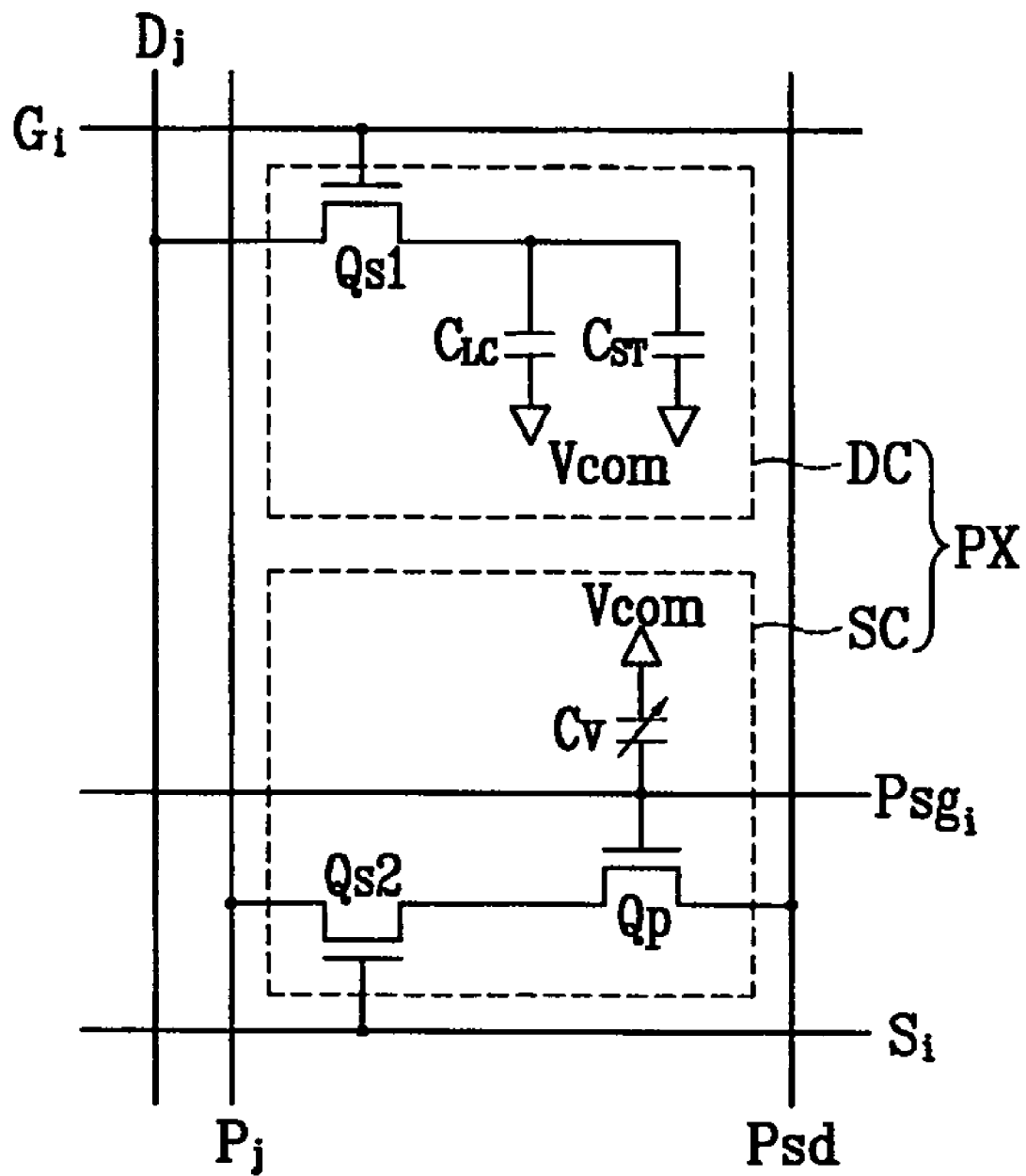
FIG. 9 is an equivalent circuit diagram of an exemplary embodiment of a pixel of an LCD device according to the present invention.
Figure 10:
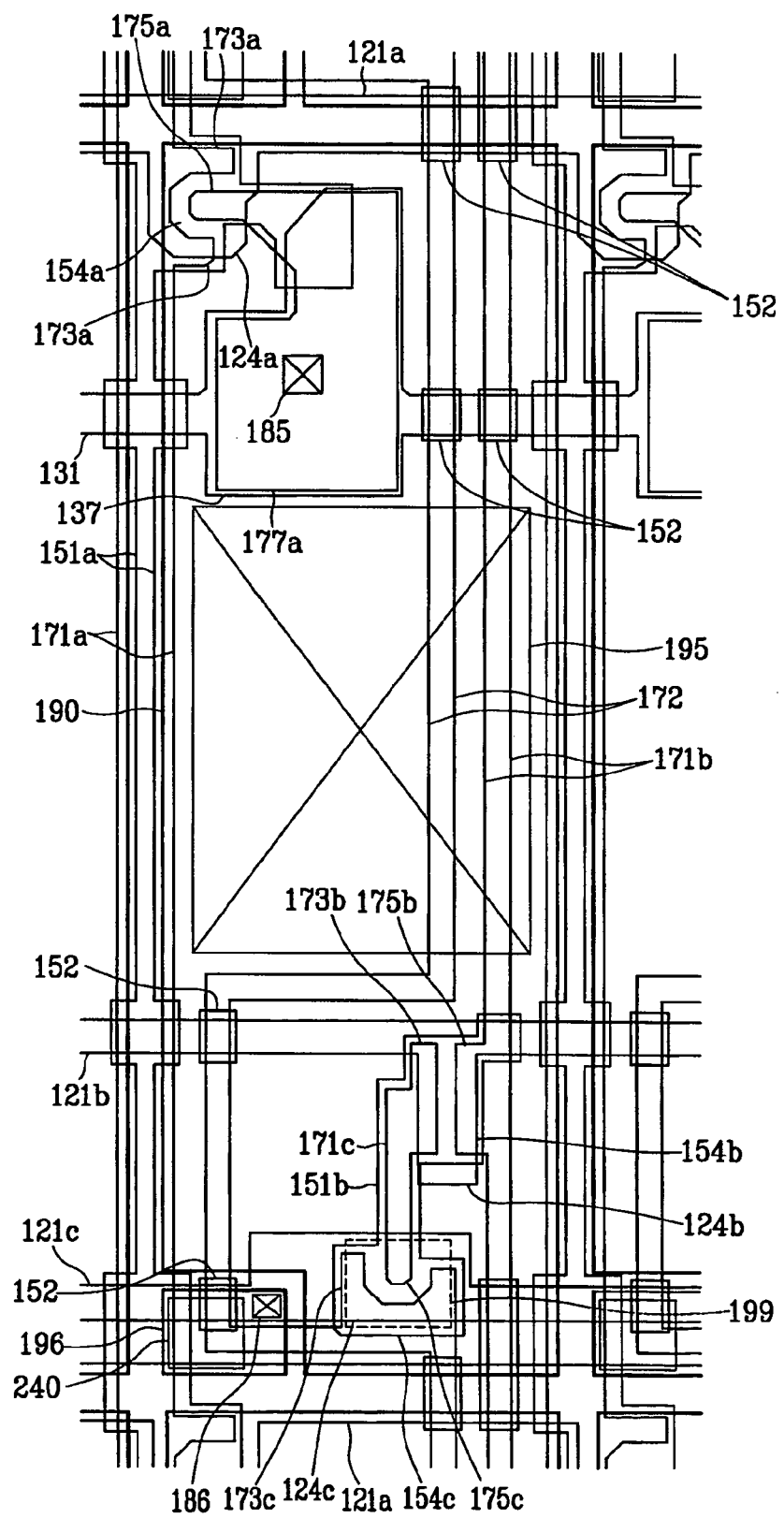
FIG. 10 is an exemplary layout view of a panel assembly of the LCD device shown FIG. 9.

FIG. 9 is an equivalent circuit diagram of a pixel of an exemplary embodiment of an LCD device according to the present invention, and FIG. 10 is an exemplary layout view of a panel assembly of the LCD device shown FIG. 9.

Referring to FIG. 9, a pixel PX in the i-th row (i=1, 2, ..., n) and the j-th column (j=1, 2, ..., m) includes a display circuit DC connected to display signal lines $G_i$ and $D_j$ and a sensing circuit SC connected to sensor signal lines $S_i$, $P_j$, Psd and $Psg_i$.

The display circuit DC includes a switching element Qs1 connected to an image scanning $G_i$ and an image data line $D_j$, and an LC capacitor $C_{LC}$ and a storage capacitor $C_{ST}$ that are connected to the switching element Qs1.

The sensing circuit SC includes a switching element Qs2 connected to a sensor scanning line $S_i$ and a sensor data line $P_j$, a sensing element Qp connected between the switching element Qs2 and an input voltage line Psd, and a variable capacitor Cv connected between the sensing element Qs2 and the common voltage Vcom.

The control terminals of the sensing elements Qp and the variable capacitors Cv in a pixel row are connected to a sensor control terminal line $Psg_i$. Accordingly, if the voltage across any one of the variable capacitors Cv in a pixel row is changed, the control voltage of all the sensing elements Qp in a pixel row is changed to vary the sensing currents of the sensing elements Qp in the pixel row.

This means that the variable capacitors Cv in a pixel row may be connected in parallel to the sensor control terminal line $Psg_i$. Then, the total capacitance of the variable capacitors Cv is much larger than each of the variable capacitors Cv such that the variation of the control voltage caused by a touch is magnified to cause a large variation of the sensor data signals. Accordingly, the LCD device ensures the existence of a touch.

In alternative embodiments, many of the above-described features of the pixel shown in FIG. 2 may be appropriate to the pixel shown in FIG. 9.

The procedures for determining whether and where a touch exists with reference to the exemplary embodiments of an LCD device detailed above will be described.

In one embodiment, a way of determining whether and where a touch exists is first to determine the existence of a touch and then to determine a touched position. In detail, the sensor data signals of the sensing elements Qp are read row by row to determine whether a touch exists. When it is determined that a touch exists, it is determined where the touch exerts by reading the sensor data signal of every sensing element Qp.

In another embodiment, a way of determining whether and where a touch exists is first to determine the existence of a touch and the longitudinal position of the touch and then to determine the transverse position of the touch. In detail, the sensor data signals of the sensing elements Qp are read row by row to determine whether a touch exists and which row the touch exerts on. When it is determined that a touch exists, it is determined which column the touch exerts on by reading the sensor data signal of every sensing element Qp.

If the determination of the existence of a touch and the position of the touch is performed only with the variation of the amount of incident light, errors may occur when a user's finger does not touch the panel assembly but it is disposed close to the panel assembly. However, if the existence of a touch is firstly determined according to the capacitance of the variable capacitor Cv and the position of the touch is latterly determined according to the amount of incident light, the accuracy of the determination can be increased.

Now, a detailed structure of an exemplary LC panel assembly including a pixel shown in FIG. 9 will be described in detail with reference to FIG. 10.

FIG. 10 is a layout view of an exemplary LC panel assembly including a pixel shown in FIG. 9.

A layered structure of this exemplary panel is almost the same as those shown in FIGS. 4-7, and thus the section thereof is not shown.

Referring to FIG. 10 as well as FIGS. 4 to 7, a panel assembly according to this embodiment also includes a TFT array panel 100, a common electrode panel 200, and an LC layer 3 interposed between the panels 100 and 200.

Regarding the TFT array panel 100, a plurality of gate conductors including a plurality of image scanning lines 121a including first control electrodes 124a, a plurality of storage electrode lines 131 including storage electrodes 137, a plurality of sensor scanning lines 121b including second control electrodes 124b, and a plurality of third control electrodes 124c are formed on a substrate 110. A gate insulating layer 140, a plurality of semiconductor stripes and islands 151a, 151b and 152 including first to third expansions 154a-154c, and a plurality of ohmic contacts 161a, 161b, 163c, 165a and 165b including first to third projections 163a, 163b and 165c are sequentially formed on the gate conductors 121a, 121b, 124c and 131. A plurality of data conductors including a plurality of image data lines 171a including first input electrodes 173a, a plurality of first output electrodes 175a, a plurality of sensor data lines 171b including second output electrodes 173b, a plurality of electrode members 171c including second input electrodes 173b and third output electrodes 175c, and a plurality of input voltage lines 172 including third input electrodes 173c are formed on the ohmic contacts 161a, 161b, 163c, 165a and 165b and the gate insulating layer 140. A passivation layer 180 including a lower passivation film 180p and an upper passivation film 180q is formed on the data conductors 171a, 171b, 171c, 172 and 175a, and the exposed portions of the semiconductor stripes and islands 151a, 151b and 152. The passivation layer 180 has a plurality of contact holes 185 exposing expansions 177a of the first output electrodes 175a, and the passivation layer 180 and the gate insulating layer 140 have a plurality of contact holes 186 exposing the third control electrodes 124c. A plurality of pixel electrodes 190 including transparent electrodes 192 and reflective electrodes 194, which have transmissive windows 195 and openings 199, and a plurality of sensing electrodes 196 including transparent electrodes 197 and reflective electrodes 198 are formed on the passivation layer 180, and an alignment layer 11 is coated thereon.

Regarding the common electrode panel 200, a light blocking member 220, a plurality of color filters 230, an overcoat 250, a plurality of risings 240, a common electrode 270, and an alignment layer 21 are formed on an insulating substrate 210.

Different from the panel assembly shown in FIGS. 4-7, the gate conductors of the TFT array panel 100 according to this embodiment further includes a plurality of sensor control terminal lines 121c.

The sensor control terminal lines 121c extend substantially parallel to the scanning lines 121a and 121b and they are separated from the scanning lines 121a and 121b. Each of the sensor control terminal lines 121c is connected to the third control electrodes 124c in a pixel row. Accordingly, variable capacitors Cv in the pixel row are connected in parallel.

In alternative embodiment, many of the above-described features of the panel assembly shown in FIGS. 4-7 may be appropriate to the panel assembly shown in FIG. 10.

LCD devices according to other exemplary embodiments of the present invention will be described in detail with reference to FIGS. 11, 12 and 13.

Figure 11:
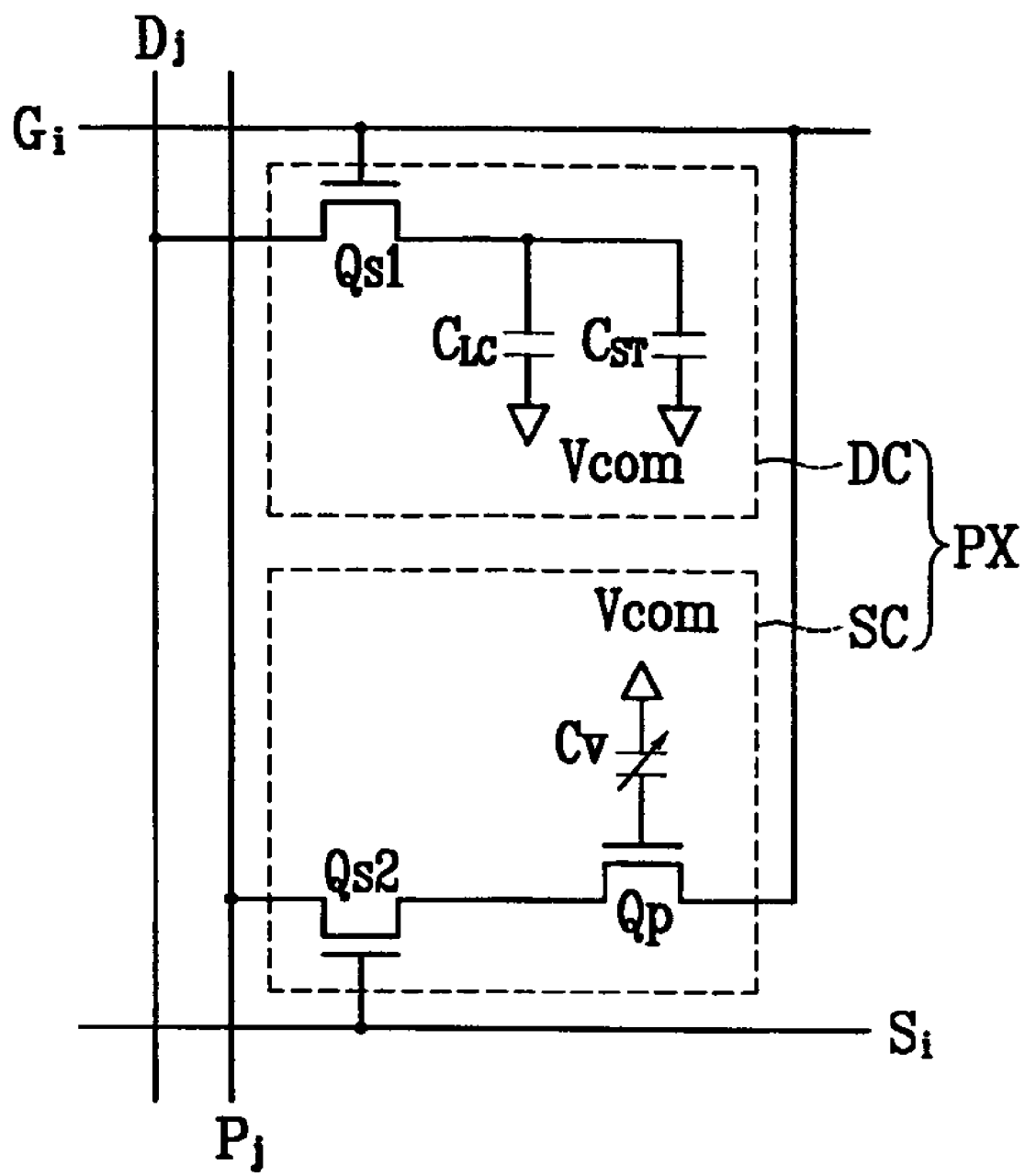
FIGS. 11-13 are equivalent circuit diagrams of other exemplary embodiments of a pixel of an LCD device according to the present invention.
Figure 12:
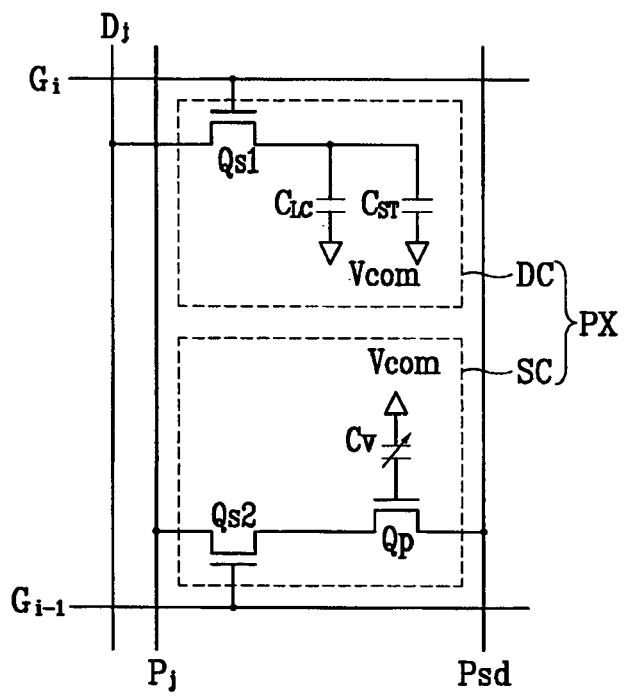
Figure 13:
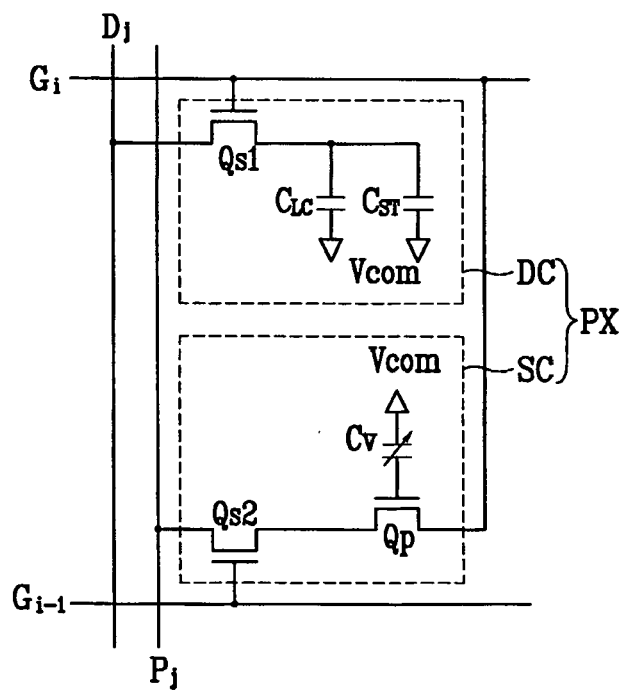

FIGS. 11-13 are equivalent circuit diagrams of a pixel of exemplary LCD devices according to the present invention.

Referring to FIGS. 11-13, a pixel PX in the i-th row (i=1, 2, ..., n) and the j-th column (j=1, 2, ..., m) includes a display circuit DC connected to display signal lines $G_i$ and $D_j$ and a sensing circuit SC connected to at least one of sensor signal lines $S_i$, $P_j$ and Psd and at least one of image scanning lines $G_i$ and $G_{i-1}$. For these embodiments, at least one of the sensor signal lines $S_i$ and Psd is omitted as compared with the exemplary LCD device shown in FIG. 2.

The display circuit DC includes a switching element Qs1 connected to the i-th image scanning line $G_i$ and the j-th image data line $D_j$, and a LC capacitor $C_{LC}$ and a storage capacitor $C_{ST}$ that are connected to the switching element Qs1.

The sensing circuit SC includes a switching element Qs2, a sensing element Qp connected to the switching element Qs2, and a variable capacitor Cv connected between the sensing element Qs2 and the common voltage Vcom.

Referring to FIG. 11, an input voltage line Psd is omitted in this embodiment. The switching element Qs2 has a control terminal connected to a sensor scanning line $S_i$, an output terminal connected to a sensor data line $P_j$, and an input terminal connected to the sensing element Qp. The sensing element Qp has a control terminal connected to the variable capacitor Cv, an output terminal connected to the switching element Qs2, and an input terminal connected to the i-th image scanning line $G_i$.

Referring to FIG. 12, a sensor scanning line $S_i$ is omitted in this exemplary embodiment. The switching element Qs2 has a control terminal connected to the (i−1)th image scanning line $G_{i-1}$ (referred to as a "previous image scanning line" hereinafter), an output terminal connected to a sensor data line $P_j$, and an input terminal connected to the sensing element Qp. The sensing element Qp has a control terminal connected to the variable capacitor Cv, an output terminal connected to the switching element Qs2, and an input terminal connected to an input voltage line Psd.

Referring to FIG. 13, a sensor scanning line $S_i$ and an input voltage line Psd are omitted in this exemplary embodiment. The switching element Qs2 has a control terminal connected to a previous image scanning line $G_{i-1}$, an output terminal connected to a sensor data line $P_j$, and an input terminal connected to the sensing element Qp. The sensing element Qp has a control terminal connected to the variable capacitor Cv, an output terminal connected to the switching element Qs2, and an input terminal connected to the i-th image scanning line $G_i$.

The previous image scanning line for a given image scanning line is supplied with a high-level voltage for turning on the switching elements Qs1 right before the given image scanning line.

In this way, the sensor scanning line $S_i$ or the input voltage line Psd can be omitted to increase the aperture ratio and to simplify the structure thereof. Furthermore, when the sensor scanning line $S_i$ is omitted, the sensor scanning driver 700 generating sensor scanning signals can be also omitted.

The control terminal of the switching element Qs2 or the input terminal of the sensing element Qp is connected to a next image signal line $G_{i+1}$ instead of the previous image scanning line $G_{i-1}$.

In alternative embodiments, the exemplary LC panel assemblies including pixels shown in FIGS. 11-13, may have openings for exposing the sensing element Qp to external light and they may include sensor control terminal line Psd connecting the control terminals of the sensing elements Qp.

Having described the exemplary embodiments of the present invention and its advantages, it is noted that various changes, substitutions and alterations can be made herein without departing from the spirit and scope of the invention as defined by appended claims. Moreover, the use of the terms first, second, etc. does not denote any order of importance, but rather the terms first, second, etc. are used to distinguish one element from another. Furthermore, the use of the terms a, an, etc. does not denote a limitation of quantity, but rather denotes the presence of at least one of the referenced item.

What is claimed is:

1. A liquid crystal display device comprising:
a first panel;
a second panel facing the first panel and spaced apart from the first panel;
a liquid crystal layer disposed between the first panel and the second panel; and
a pixel including a display circuit and a sensing circuit;
wherein the display circuit comprises a liquid crystal capacitor; and
wherein the sensing circuit comprises:
a variable capacitor having a capacitance that varies in response to a touch applied on one of the first panel and the second panel, the variable capacitor generating a control voltage that has a magnitude depending on the capacitance; and
a sensing element disposed on the second panel, wherein the sensing element generates a sensing signal based on the control voltage, and a control terminal of the sensing element is coupled with the variable capacitor.

2. The liquid crystal display device of claim 1, wherein the touch comprises pressure.

3. The liquid crystal display device of claim 1, wherein the variable capacitor comprises a first capacitor electrode disposed on the first panel and a second capacitor electrode disposed on the second panel.

4. The liquid crystal display device of claim 3, wherein a distance between the first capacitor electrode and the second capacitor electrode varies by the touch to vary the capacitance of the variable capacitor.

5. The liquid crystal display device of claim 4, wherein the sensing element generates an electrical signal included in the sensing signal in response to light incident into the liquid crystal display device.

6. The liquid crystal display device of claim 5, wherein the light incident into the liquid crystal display device is varied by the touch.

7. The liquid crystal display device of claim 6, wherein the sensing element comprises amorphous silicon or polysilicon.

8. The liquid crystal display device of claim 4, wherein the first capacitor electrode is supplied with a predetermined voltage having a magnitude swinging between two values.

9. The liquid crystal display device of claim 4, wherein the sensing element comprises the control terminal, an input terminal, and an output terminal, and the control terminal of the sensing element is connected to the second capacitor electrode of the variable capacitor.

10. The liquid crystal display device of claim 9, further comprising a first switching element connected to the output terminal of the sensing element and selectively outputting the sensing signal.

11. The liquid crystal display device of claim 10, further comprising a sensor capacitor disposed between the control terminal and the output terminal of the sensing element.

12. A liquid crystal display device comprising:
an image scanning line;
an image data line intersecting the image scanning line;
a sensor data line intersecting the image scanning line, the sensor data line being separated from the image scanning line and the image data line; and
a pixels including a display circuit and a sensing circuit,
wherein the display circuit comprises a liquid crystal capacitor and a first switching element connected to the liquid crystal capacitor, the image scanning line, and the image data line, the sensing circuit comprises a variable capacitor having a capacitance that varies in response to a touch applied on a display panel of the liquid crystal display device, a sensing element connected to the variable capacitor, and a second switching element connected to the sensing element and the sensor data line, and
wherein each of the second switching element and the sensing element includes a control terminal, an input terminal, and an output terminal, the input terminal of the second switching element is coupled with the output terminal of the sensing element, the output terminal of the second switching element is connected to the sensing data line, and the control terminal of the sensing element is coupled with the variable capacitor.

13. The liquid crystal display device of claim 12, wherein the variable capacitor comprises first and second electrodes facing each other, the liquid crystal capacitor comprises third and fourth electrodes facing each other, and the second electrode and the fourth electrode form a continuous plane.

14. The liquid crystal display device of claim 13, wherein a distance between the first electrode and the second electrode is smaller than a distance between the third electrode and the fourth electrode.

15. The liquid crystal display device of claim 13, wherein the variable capacitor comprises a first liquid crystal dielectric disposed between the first electrode and the second electrode, and the liquid crystal capacitor comprises a second liquid crystal dielectric disposed between the third electrode and the fourth electrode.

16. The liquid crystal display device of claim 15, wherein the first liquid crystal dielectric and the second liquid crystal dielectric electromagnetically influence each other via changes in electromagnetic field caused by changes in alignment of dielectric molecules, and the first liquid crystal dielectric is thinner than the second liquid crystal dielectric.

17. The liquid crystal display device of claim 12, further comprising a sensor control terminal line, the sensor control terminal line connected to the control terminal of the second switching elements.

18. The liquid crystal display device of claim 12, further comprising a sensing scanning line connected to the control terminal of the second switching element.

19. The liquid crystal display device of claim 18, wherein the input terminal of the sensing element is supplied with a predetermined voltage.

20. The liquid crystal display device of claim 18, wherein the input terminal of the sensing element is connected to the image scanning line.

21. The liquid crystal display device of claim 18, further comprising:
an image scanning driver generating an image scanning signal to be applied to the image scanning line;
an image data driver applying an image data signal to the image data line;
a sensor scanning driver generating a sensor scanning signal to be applied to the sensor scanning line;
a sensing signal processor receiving and processing a sensing signal from the sensing element; and
a signal controller providing a control signal to the image scanning driver, the image data driver, the sensing scanning driver, and the sensing signal processor.

22. The liquid crystal display device of claim 12, wherein the control terminal of the second switching element is connected to the image scanning line.

23. The liquid crystal display device of claim 22, wherein the input terminal of the sensing element is connected to the image scanning line.

24. The liquid crystal display device of claim 22, wherein the input terminal of the sensing element is supplied with a predetermined voltage.

25. The liquid crystal display device of claim 22, further comprising:

an image scanning driver generating an image scanning signal to be applied to the image scanning line;

an image data driver applying an image data signal to the image data line;

a sensing signal processor receiving and processing a sensing signal from the sensing element; and a signal controller providing a control signal to the image scanning driver, the image data driver, and the sensing signal processor.

* * * * *